(12) United States Patent  
Lee et al.

(10) Patent No.: US 8,446,712 B2  
(45) Date of Patent: May 21, 2013

(54) PORTABLE ELECTRONIC APPARATUS

(75) Inventors: Taegyun Lee, Seoul (KR); Hyosik Shin, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 210 days.

(21) Appl. No.: 12/961,991

(22) Filed: Dec. 7, 2010

(65) Prior Publication Data

US 2011/0261514 A1     Oct. 27, 2011

(30) Foreign Application Priority Data

Apr. 26, 2010 (KR) .................. 10-2010-0038636

(51) Int. Cl.  
    *H05K 7/00*     (2006.01)

(52) U.S. Cl.  
    USPC ............ 361/679.01; 361/679.39; 361/679.38; 361/727; 361/737

(58) Field of Classification Search  
    USPC ........................................................ 361/679  
See application file for complete search history.

(56) References Cited

U.S. PATENT DOCUMENTS

| 7,931,505 | B2 * | 4/2011 | Howard et al. ............ 439/680 |
| 2004/0077207 | A1 | 4/2004 | Ice | |
| 2005/0049016 | A1 | 3/2005 | Cho et al. | |
| 2011/0070759 | A1 * | 3/2011 | Matsumoto et al. .......... 439/159 |
| 2011/0273832 | A1 * | 11/2011 | Tracy et al. ............. 361/679.31 |

FOREIGN PATENT DOCUMENTS

| JP | 2000-331742 | 11/2000 |
| KR | 10-0834636 | 6/2008 |

* cited by examiner

*Primary Examiner* — Tuan T Dinh  
*Assistant Examiner* — Mukund G Patel  
(74) *Attorney, Agent, or Firm* — Morgan, Lewis & Bockius LLP

(57) ABSTRACT

Disclosed is a portable electronic apparatus including a main body formed with an opening on a surface thereof; a plurality of connection ports disposed to be exposed through an opening of the main body; a door disposed on the opening to be rotated between a first configuration that covers the connection ports and a second configuration that opens the connection ports; a moving mechanism formed to move the connection ports in a direction to be protruded from the opening when the door is rotated to the second configuration, and configured to be operated in conjunction with being pressed of the door; and a locking mechanism formed such that the connection ports are locked in the second configuration in conjunction with the rotation of the door to limit the movement of the connection ports in a direction to be inserted into the opening.

17 Claims, 8 Drawing Sheets

PORTABLE ELECTRONIC APPARATUS

CROSS-REFERENCE TO RELATED APPLICATION

Pursuant to 35 U.S.C. §119(a), this application claims the benefit of earlier filing date and right of priority to Korean Application No. 10-2010-0038636, filed on Apr. 26, 2010, the contents of which is incorporated by reference herein in its entirety.

BACKGROUND OF THE INVENTION

1. Field of the Invention

The present invention relates to a portable electronic apparatus having a connection port that can be connected to an external device and a door that covers the connection port.

2. Background of the Invention

A portable electronic apparatus is an electronic device that can be hand-carried, as well as having at least one of a voice and video communication function, an information input and/or output function, a data storage function, and the like.

As the functions becomes diversified, the terminal is implemented in the form of a multimedia player having complicated functions such as capturing still or moving images, playing music or video files, gaming, receiving broadcast signals, and the like.

In order to implement such complicated functions in a multimedia player, various new attempts have been applied in the aspect of the hardware or software. As an example, a user interface environment is provided to allow the user to easily and conveniently retrieve or select the functions.

However, when considering the portability of an portable electronic apparatus, a lot of connection ports should be placed inside the portable electronic apparatus, thereby reducing the usage of connection ports. Accordingly, a mechanism for considering the portability of an portable electronic apparatus and the usage of connection ports at the same time may be considered.

SUMMARY OF THE INVENTION

Therefore, an object of the present invention is to provide a portable electronic apparatus in which a connection port is more easily opened and closed.

Another object of the present invention is to provide the appearance of a slim portable electronic apparatus while maintaining the usage of a connection port.

In order to solve the foregoing problem, a portable electronic apparatus according to an embodiment of the present invention may include a main body formed with an opening on a surface thereof, a plurality of connection ports disposed to be exposed through an opening of the main body, a door disposed on the opening to be rotated between a first configuration that covers the connection ports and a second configuration that opens the connection ports, a moving mechanism formed to move the connection ports in a direction to be protruded from the opening when the door is rotated to the second configuration, and configured to be operated in conjunction with being pressed of the door, and a locking mechanism formed such that the connection ports are locked in the second configuration in conjunction with the rotation of the door to limit the movement of the connection ports in a direction to be inserted into the opening.

As an example associated with the present invention, the moving mechanism may include a guide member having a guide rail, mounted on the main body, a housing mounted with the connection ports, slidably connected with the guide rail, and formed such that a force exerted to the door is transferred, and a pressure module formed such that the length thereof is sequentially increased or reduced by pressure, and disposed such that one end thereof is fixed and the other end thereof supports the housing. The door may be rotatably mounted on the housing.

As another example associated with the present invention, the door may include a cover and rotating blades. The cover is formed to correspond to the opening, and the rotating blades are extended from the both ends of the cover, respectively, and rotatably combined with the housing. At least some of the rotating blades may be formed to be locked in the guide member in a rotation direction of the door in the first configuration to limit the rotation of the door. At least some of the rotating blades may be formed to be locked in the guide member in a direction to be inserted into the opening in the second configuration to limit the movement of the connection ports.

As another example associated with the present invention, the guide member may include a base portion and a bent portion. The base portion is mounted on the main body, and disposed to face the opening. The bent portion is bent at both ends of the base portion, and the bent portion is formed with the guide rail. The pressure module may be inserted between the surfaces facing each other of the base portion and the housing. The housing is formed with a landing portion on which the pressure module is landed, and the landing portion is formed such that either one of both surfaces facing each other in a sliding direction of the housing is opened and the other thereof is closed, and the base portion is formed to face the opened portion of the landing portion.

As another example associated with the present invention, the bent portion is formed with a predetermined length, and the rotating blade is formed such that it is slid along one surface of the bent portion in conjunction with the sliding of the housing, and rotated if it is disengaged from the one surface of the bent portion. One end of the rotating blade is connected to the cover, and the other end thereof makes a free end. The rotating blade is rotatably combined with the housing between the both ends, and the free end is locked in an end portion of the bent portion by being disengaged from one surface of the bent portion to be rotated.

As another example associated with the present invention, the housing may include a supporting portion, a protruding portion, and a guide blade portion. The supporting portion is formed to cover an inner surface of the main body, and disposed with a circuit board mounted with the connection ports. The protruding portion is protruded from at least one end of the supporting portion, and the guide blade portion is formed on the protruding portions, and made to correspond to the guide rail. The door is rotatably connected to the protruding portion.

As another example associated with the present invention, the moving mechanism is provided with a housing mounted with the connection ports, and slidably connected to the main body. The connection port is formed to sequentially pressurize or release the housing in conjunction with being pressed of the door to relatively move with respect to the opening between the first and the second configurations.

As another example associated with the present invention, the housing is slidably connected to a guide member mounted on the main body, and the door is rotatably connected to the housing. A pressure module is disposed in a lengthy direction such that the length thereof is sequentially increased and reduced by pressure between the housing and guide member.

As another example associated with the present invention, the pressure module may include a first and a second body combined to relatively move to each other, an elastic member disposed to exert an elastic force in a direction that the first and the second body are apart from each other, and a cam portion installed to be associated with the first and the second body, and formed to guide the movement of the first and the second body by pressure. The cam portion may include a cam pin and a cam. The cam pin is mounted on the first body, and the cam is formed on the second body. The cam is made to guide the movement of the cam pin along a closed loop, and formed such that it is interlocked at an intermediate position of the closed loop and the interlocking is released by pressure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
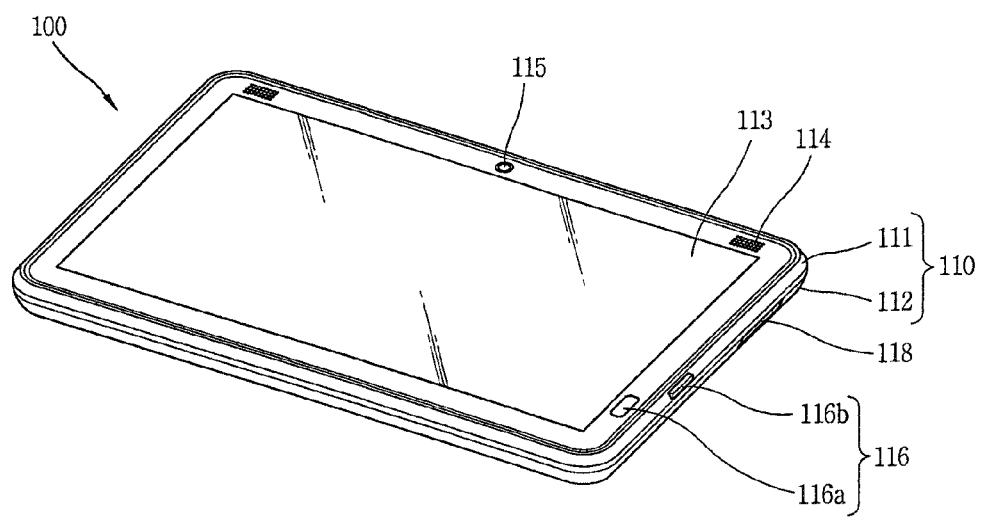
FIG. 1 is a perspective view of a portable electronic apparatus associated with an embodiment of the present invention.

Hereinafter, a portable electronic apparatus associated with the present invention will be described in more detail with reference to the accompanying drawings. The suffixes "module" and "unit or portion" for components used in the following description merely provided only for facilitation of preparing this specification, and thus they are not granted a specific meaning or function.

This specification employs like/similar reference numerals for like/similar components irrespective of different embodiments, so they all will be understood by the first description. The expression in the singular form in this specification will cover the expression in the plural form unless otherwise indicated obviously from the context.

A portable electronic apparatus illustrated herein may include a laptop computer, a tablet PC, a smart phone, a digital broadcasting terminal, a personal digital assistants (PDA), a portable multimedia players (PMP), a navigator, and the like.

FIG. 1 is a perspective view illustrating a portable electronic apparatus 100 associated with an embodiment of the present invention. FIG. 1 illustrates a tablet PC as an example of the portable electronic apparatus.

The portable electronic apparatus 100 described herein includes a body (or main body) 110. However, the present invention will not be limited to this, but may be also applicable to various structures, such as mobile devices having at least two bodies coupled to each other to be relatively moved.

A body may include a case (housing, casing, cover, etc.) forming the outside of the portable electronic apparatus 100. In this embodiment, the case may be divided into a front case 111 and a rear case 112. In addition, various electronic components may be incorporated into a space between the front case 111 and the rear case 112. At least one intermediate case may be additionally disposed between the front case 111 and the rear case 112.

Further, the cases can be formed of resin in a manner of injection molding, or formed with metallic materials such as stainless steel (STS) and titanium (Ti).

A display unit 113, an audio output module 114, a camera 115, a user input unit 116 and the like may be disposed on the electronic apparatus body, particularly, on the front case 111.

The display unit 113 may occupy most of a principal surface of the front case 111.

The display unit 113 is provided to display visible information or image information, and the display unit 113 may include at least one of a Liquid Crystal Display (LCD), a Thin Film Transistor-LCD (TFT-LCD), an Organic Light Emitting Diode (OLED) display, a flexible display, or a three-dimensional (3D) display. The display unit 113 may include a touch-pad for allowing a user's touch input. In this case, the display unit 113 may operate as a touch screen.

The display unit 113 may output various types of visible information. Such information may be output in various forms of letter, number, symbol, graphic, icon or the like.

For the input of such information, at least one of the letters, the numbers, the symbols, the graphics or the icons may be displayed in a present arrangement, thereby implementing a type of keypad, which may be called a 'soft key.'

The display unit 113 may operate as an overall region, or by being divided into plural regions. For the latter, the plurality of regions may be configured to cooperatively operate together.

The user input unit 116 may be manipulated to receive commands for controlling operations of the mobile device 100, and include a plurality of manipulation units 116a and 116b. The manipulation units 116a and 116b may also be commonly referred to as a manipulating portion, which can be manipulated in any tactile manner that the user can make a touch input.

For instance, the manipulation units 116a and 116b can be implemented as a keypad, a dome switch, a touchpad (e.g., static pressure/capacitance), a jog wheel, a jog switch and the like.

The information input via the plurality of manipulation units 116a and 116b may be configured in various manners. For instance, the first manipulation unit 116a may be used to receive a command such as START, END, etc., and the second manipulation unit 116b may be formed to receive a command such as SCROLL or the like, or a command such as volume adjustment of sound output from the audio output module 114.

The audio output module 114 and the camera 115 may be located at a region adjacent to one of both ends of the display unit 113. The audio output module 114 may include a speaker, a receiver, and the like. The camera 115 may be provided in an electronic apparatus body in a rotatable or pop-up manner.

A controller for controlling the display unit 113 and the user input unit 116 may be disposed in the body. The controller may be implemented as a printed circuit board.

Figure 2:
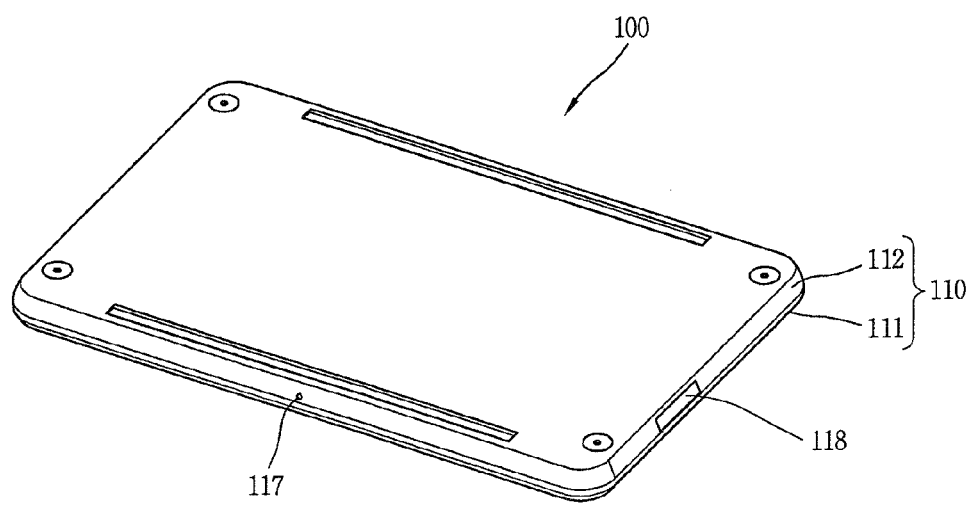
FIG. 2 is a rear perspective view of the portable electronic apparatus illustrated in FIG. 1.

FIG. 2 is a rear perspective view of the portable electronic apparatus 100 of FIG. 1.

An audio output module may further be disposed at a rear surface of the portable electronic apparatus body. The audio output module may cooperate with the audio output module 114 (see FIG. 1) to implement a stereo function. Also, the audio output module may be used to implement a speakerphone mode.

A broadcast signal reception antenna may be disposed at a lateral surface of the mobile device body. The antenna may be provided in a retractable manner in the portable electronic apparatus body.

Referring to the drawing, the portable electronic apparatus body may include a microphone 117, a power supply unit, and the like. The microphone 117 may be disposed at a region adjacent to an end portion different from one end portion disposed with the audio output module 114. The power supply unit for supplying power to the mobile device 100 may be mounted on the mobile device body, and may be mounted inside the body as a built-in battery, for example.

The interface unit 118 and the like may be located at lateral surfaces of the front case 111 and the rear case 112. The interface unit 118 receives data from an external device, transfers each component inside the portable electronic apparatus 100, or transmit data inside the portable electronic apparatus 100 to an external device.

Figure 3:
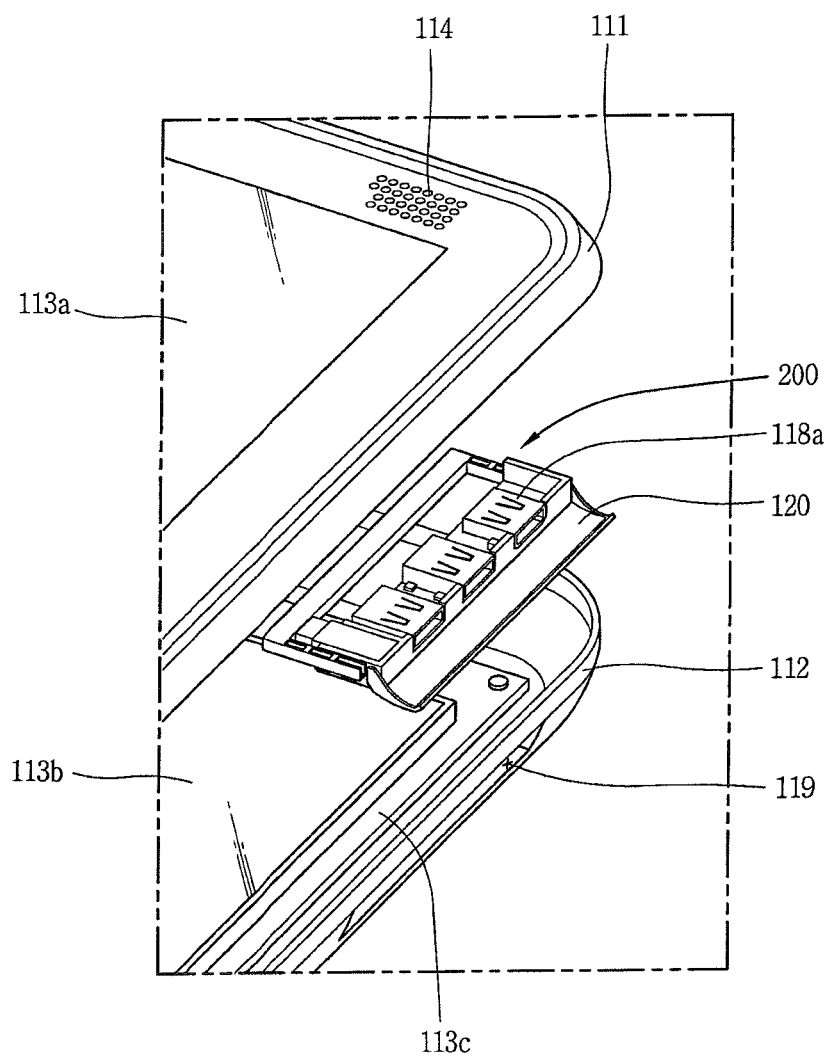
FIG. 3 is an exploded perspective view illustrating a part of the portable electronic apparatus in FIG. 1.

FIG. 3 is an exploded perspective view illustrating a part of the portable electronic apparatus in FIG. 1.

Referring to the drawings, a window 113a is mounted on a front surface of the front case 111, and a display 113b and a main circuit board 113c are sequentially laminated to correspond to the window 113a, and the interface unit 118 (see FIGS. 1 and 2) is electrically connected to the main circuit board 113c.

The interface unit 118 may include a plurality of connection ports 118a. A plurality of the connection ports 118a may include, for example, at least one of a connection terminal to be wired or wirelessly connected to an earphone, a port for short-range communication (e.g., infrared (IrDA) port, Bluetooth port, wireless LAN port, etc.), or a power supply terminal for supplying power to the portable electronic apparatus. The connection ports 118a may be a card socket for accommodating an external card such as Subscriber Identification Module (SIM), User Identity Module (UIM), memory card for storing information or the like.

According to the drawing, an opening 119 is formed on the rear case 112 to expose the connection ports 118a to the outside, and the connection ports 118a are disposed on the rear case 112 to correspond to the opening 119. Hereinafter, it will be described as a reference that connection ports 118a and components associated with the connection ports 118a are disposed on the rear case 112, but the present invention will not be limited to this. For example, the connection ports 118a may be disposed on the front case 111.

More specifically, the connection ports 118a are disposed to be exposed to the outside through the opening 119, and the opening 119 is disposed at a lateral surface of the rear case 112. The opening 119 is closed by a door 120 not to be exposed to the outside when the connection ports 118a are not used. The door 120 is disposed on the opening 119, and formed to be rotated between a first configuration (see FIG. 8A) that covers the connection ports 118a and a second configuration (see FIG. 8C) that opens the connection ports 118a.

Referring to the drawings, the connection ports 118a and the door 120 are interlocked with each other by a moving mechanism 200. The moving mechanism 200 allows the connection ports 118a to be slid in conjunction with being pressed of the door 120 such that the connection ports 118a are moved in a direction to be protruded from the opening 119 if the door 120 is rotated to the second configuration.

Figure 4:
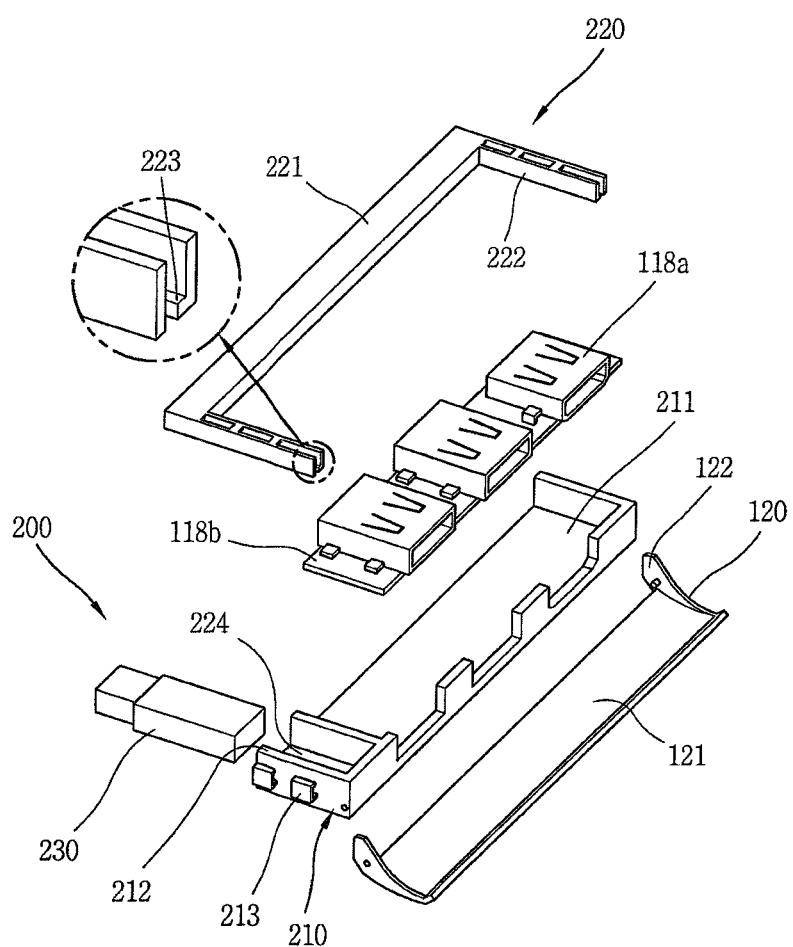
FIG. 4 is an exploded view illustrating a connection port, a door, and a moving mechanism in FIG. 3.

Hereinafter, the moving mechanism 200 will be described in more detail with reference to FIG. 4. FIG. 4 is an exploded view illustrating a connection port 118a, a door 120, and a moving mechanism 200 in FIG. 3.

The moving mechanism 200 may include a housing 210 mounted with the connection ports 118a, and the housing 210 is slidably connected to the rear case 112 (see FIG. 3).

According to the function of the moving mechanism 200 associated with the housing 210, the moving mechanism 200 is formed to sequentially pressurize or release the housing 210 in conjunction with being pressed of the door 210, thereby allowing the connection ports 118a to relatively move with respect to the opening 119 (see FIG. 3) between the first and the second configurations.

The housing 210 may include a supporting portion 211, a protruding portion 212, and a guide blade portion 213.

The supporting portion 211 is formed to cover an inner surface of the rear case 112, and a circuit board 118b is disposed at a surface of the supporting portion 211. The circuit board 118b is mounted with the connection ports 118a, and the circuit board 118b is electrically connected to a main circuit board 113c (see FIG. 3).

The protruding portion 212 is protruded from at least one end of the supporting portion 211. According to the drawing, the protruding portion 212 is protruded in a vertical direction at both ends of the supporting portion 211, and the guide blade portion 213 is formed at the protruding portion 212.

The guide blade portion 213 is made to correspond to a guide rail 223, and the sliding movement of the housing 210 is guided through this. In this manner, the housing 210 is mounted with the connection ports 118a, and the housing 210 and the guide rail 223 are slidably connected to each other.

According to the drawing, the guide rail 223 is formed at a guide member 220, and the guide member 220 may include a base portion 221 and a bent portion 222.

The base portion 221 is mounted on the rear case 112, and disposed to face the opening 119 at a lateral surface of the rear case 112. For example, the base portion 221 is formed in a bar shape, and disposed to be parallel to the opening 119. The length of the base portion 221 corresponds to the length of the housing 210, and the base portion 221 and the housing 210 may be brought into contact with each other in the first configuration to limit the depth to be inserted into an inner portion of the rear case 112.

The bent portion 222 is bent at both ends of the base portion 221. For example, the bent portion 222 is extended in a vertical direction at both ends of the base portion 221 to be parallel with the guide blade portion 213 of the housing 210, and a guide rail 223 is formed at the bent portion 222.

Referring to the drawing, the door 120 is mounted to be rotated at the housing 210, and may include a cover 121 and rotating blades 122.

The cover 121 is formed to correspond to the opening 119 of the rear case 112. For the cover 121, the length direction thereof is formed along a lateral surface of the rear case 112, and the length direction thereof is formed to be longer than the width direction. Further, the cover 121 is formed in a bar shape that forms both ends with respect to the length direction.

The drawing illustrates a configuration in which the cover 121 is disposed to open the connection ports 118a. The cover 121 may be formed such that a front surface of the cover 121 (i.e., a surface opposite to the surface covering the connection ports 118a) makes the same plane as a lateral surface of the rear case 112 in the closed configuration.

The door 120 is formed to move the both ends of the cover 121 toward a main surface of the rear case 112 (i.e., a rear surface of the body) at a lateral surface of the rear case 112 to open the connection ports 118a. However, the present invention will not be limited to this, and the door 120 may be formed to move the both ends of the cover 121 toward a main surface of the front case 111 (i.e., a front surface of the body) at a lateral surface of the rear case 112.

For the rotation of the cover 121, the rotating blades 122 are extended from the both ends of the cover 121, respectively, and rotatably combined with the housing 210. For example, the rotating blades 122 is rotatably connected to a protruding portion 212 of the housing 210.

The door 120 is made to limit the rotation in the first configuration. More specifically, at least some of the rotating blades 122 are formed to be locked in the guide member 220 in the rotation direction of the door 120 in the first configuration. The rotating blades 122 are formed to be protruded toward the base portion 221 at a lower side of the bent portion 222 of the guide member 220 at a portion connected to the housing 210 (see FIG. 7A). In this case, even though rotation force is exerted to the cover 121 in a direction toward the main surface of the rear case 112, the rotating blades 122 are locked in a lower surface of the bent portion 222, and thus the rotation of the door 120 may be limited.

Using the connection structure, the housing 210 is formed such that the force exerted to the door 120 is transferred. More specifically, as the rotating blades 122 are combined with the protruding portion 212, the force exerted to the cover 121 is transferred to the housing 210 through the rotating blades 122 and the protruding portion 212. The moving mechanism 200 is formed such that the force transferred to the housing 210 is exerted to the pressure module 230.

The pressure module 230 is formed such that the length thereof is sequentially increased or reduced by pressure, and disposed in a length direction between the housing 210 and the guide member 220. The pressure module 230 may be formed such that one end thereof in the length direction is fixed and the other end thereof supports the housing. For example, the pressure module 230 is inserted between the surfaces facing each other of the base portion and the housing.

According to the drawing, the housing 210 is formed with a landing portion 224 on which the pressure module is landed.

The landing portion 224 is formed such that either one of both surfaces facing each other in a sliding direction of the housing is opened and the other thereof is closed, and the base portion 221 of the guide member 220 is formed to face the opened portion of the landing portion. The pressure module 230 of the landing portion 224 is formed such that one end thereof is brought into contact with the base portion 221 through an opened portion of the landing portion 224, and the other end thereof is brought into contact with a closed portion of the landing portion 224.

According to the structure, the force exerted to the cover 121 is transferred to the pressure module 230 through the housing 210. Accordingly, if the cover 121 is pressed by the user, then force is exerted to the pressure module 230, and the length of the pressure module 230 is extended, thereby allowing the housing 210 to be slid toward the opening 119. As an example of the pressure module 230 in which the length thereof is sequentially varied as described above, the pressure module 230 may be a push-push mechanism.

Figure 5:
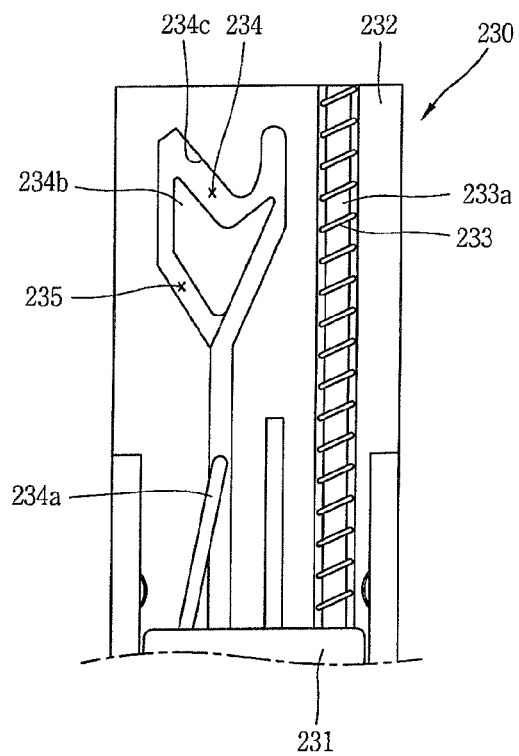
FIG. 5 is a conceptual view illustrating the concept of a pressure module in FIG. 4.

Hereinafter, the structure and operation of the pressure module 230 will be described with reference to FIGS. 5 through 6C. FIG. 5 is a conceptual view illustrating the concept of a pressure module 230 in FIG. 4, and FIGS. 6A through 6C are operational views illustrating the operation of a pressure module 230 in FIG. 5.

Referring to FIG. 4, the pressure module 230 may include a first body 231, a second body 232, an elastic member 233, and a cam portion 234.

Either one of the first and the second body 231, 232 is accommodated in the other one, and combined to be relatively moved to each other. The length of the pressure module 230 is varied by the relative movement.

An elastic member 233 and a cam portion 234 are disposed inside the first and the second body 231, 232.

The elastic member 233 is disposed to exert elastic force in a direction that the first and the second body 231, 232 are becoming apart from each other. For example, a long guide rod 233a is provided in a moving direction of the first and the second body 231, 232, and a spring is installed in the guide rod 233a. The spring is a coil spring, which provides elastic force to the first and the second body 231, 232.

The cam portion 234 is installed to be associated with the first and the second body 231, 232, and formed to guide the movement of the first and the second body 231, 232 by pressure. The cam portion 234 may include a cam pin 234a and a cam 234b.

The cam pin 234a is mounted on the first body 231, and extended toward the second body 232. An end portion of the cam pin 234a is formed to be locked in the cam 234b.

The cam 234b is formed on the second body 232, and made to guide the movement of the cam pin 234a along a closed loop 235. The cam 234b is formed such that the cam pin 234a is interlocked at an intermediate position of the closed loop 235 and the interlocking is released by pressure.

According to the drawing, a cam guide 234c is protruded along a circumference of the cam 234b, and a cam path, namely, the closed loop 235, is formed between the cam 234b and the cam guide 234c. An end portion of the cam pin 234a is moved along the closed loop 235.

The closed loop 235 is formed in a heart shape, and provided with a structure, for example, a step or the like, for limiting rotation in an opposite direction to rotate the cam pin 234a only in one direction.

Figure 6A:
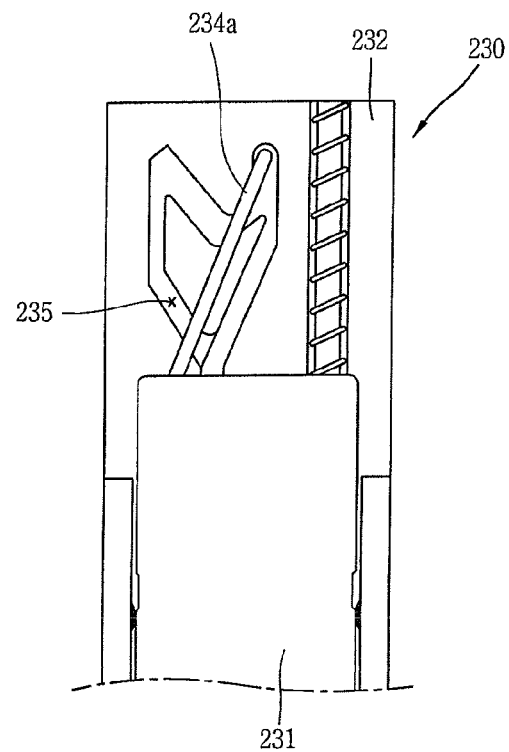
FIGS. 6A through 6C are operational views illustrating the operation of a pressure module in FIG. 5.
Figure 6B:
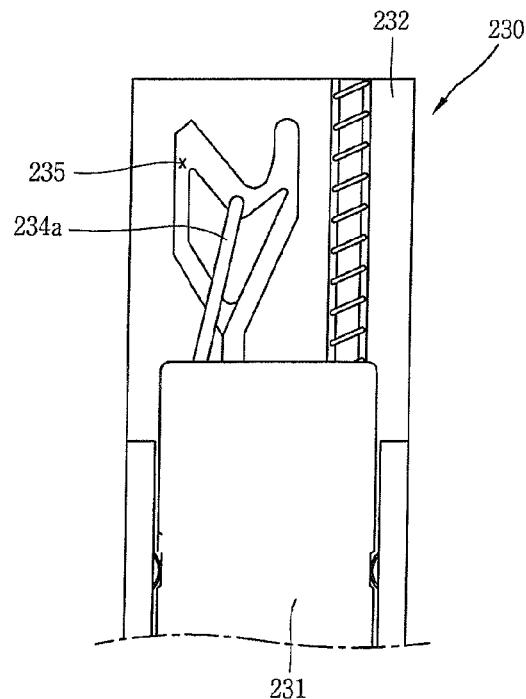

Referring to FIG. 6A, if either one of the first and the second body 231, 232 is pressed, then the cam pin 234a is moved to an upper right end of the heart shape along the closed loop 235. Referring to FIG. 6B, the cam pin 234a is accommodated in a concave point of the heart shape, and at this time the length of the pressure module 230 is reduced, and the cam pin 234a is interlocked at the intermediate position thereof.

Figure 6C:
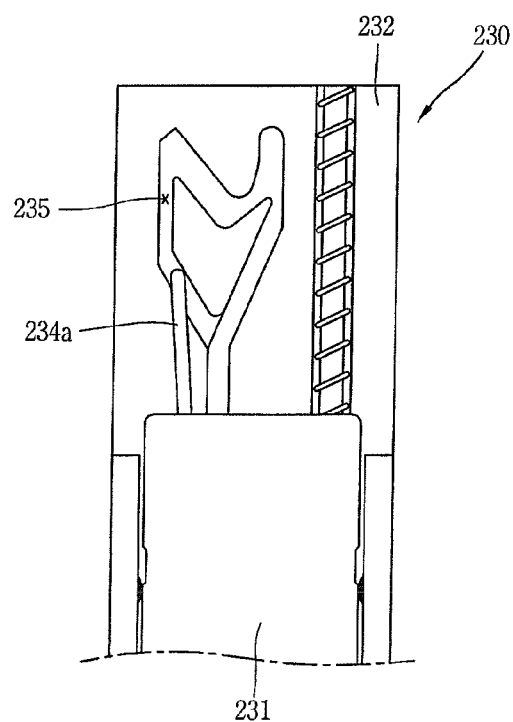

Referring to FIG. 6C, as either one of the first and the second body 231, 232 is pressed again, then the cam pin 234a is disengaged from the concave point of the heart shape, and restored to an initial position along the closed loop 235. In this case, the length of the pressure module 230 is extended.

The pressure module 230 repeats the extension and reduction of the length by continuous presses using the structure, and it constitutes a moving mechanism 200 according to the present invention, together with the housing 210 and the guide member 220.

Figure 7A:
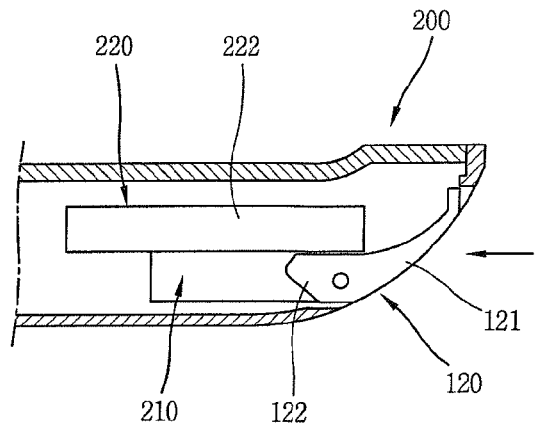
FIGS. 7A through 7C are operational views illustrating the operation of a moving mechanism in FIG. 3.
Figure 7B:
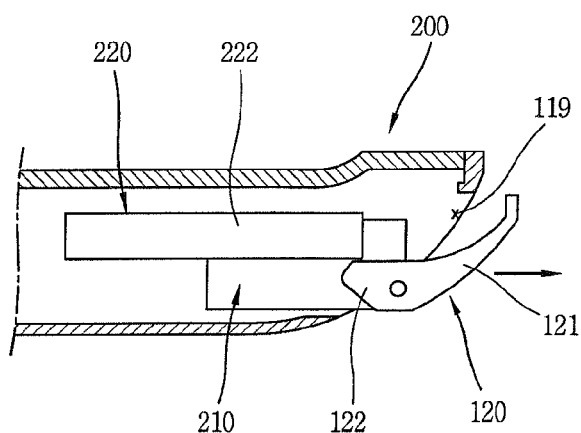
Figure 7C:
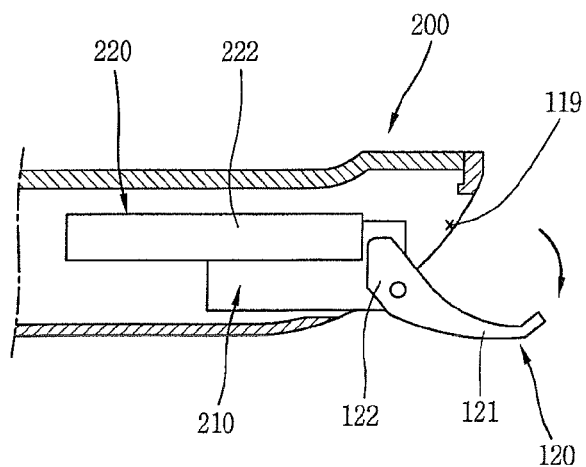

FIGS. 7A through 7C are operational views illustrating the operation of a moving mechanism in FIG. 4.

Referring to the drawings, the bent portion 222 of the guide member 220 is provided with a predetermined length, and formed such that the rotating blade 122 of the door 120 is slid along one surface of the bent portion 222 in conjunction with the sliding of the housing 210, and rotated if it is disengaged from the one surface of the bent portion 222.

In the first configuration illustrated in FIG. 7A, if the cover 121 of the door 120 is pressed by the user, then force is transferred to the pressure module 230 (see FIG. 4) to increase the length of the pressure module 230. By the extension of the pressure module 230, the guide blade portion 213 is slid along the guide rail 223 (see FIG. 4) as illustrated in FIG. 7B, and the rotating blade 122 is guided by the one surface of the bent portion 222.

For the rotating blade 122, one end thereof is connected to the cover 121, and the other end thereof makes a free end, and the rotating blade 122 is rotatably combined with the housing 210 between the both ends. Referring to FIG. 7C, the free end of the rotating blade 122 is rotated if it is disengaged from the one surface of the bent portion 222, and locked in an end portion of the bent portion 222 by the rotation. Through this, the movement of the connection ports 118a (see FIG. 4) is limited in the second configuration, and the foregoing construction forms a locking mechanism of the connection ports 118a.

In other words, the locking mechanism is formed to lock the connection ports 118a in the second configuration in conjunction with the rotation of the door 120. More specifically, the locking mechanism is formed such that one surface of the rotating blade 122 is locked in one end of the guide member 220 in a direction to be inserted into the opening 119. In this manner, as the movement of the connection ports 118a is limited in the second configuration, the fixation of the connection ports 118a can be maintained when the user inserts a connection cable into the connection ports 118a.

Figure 8:
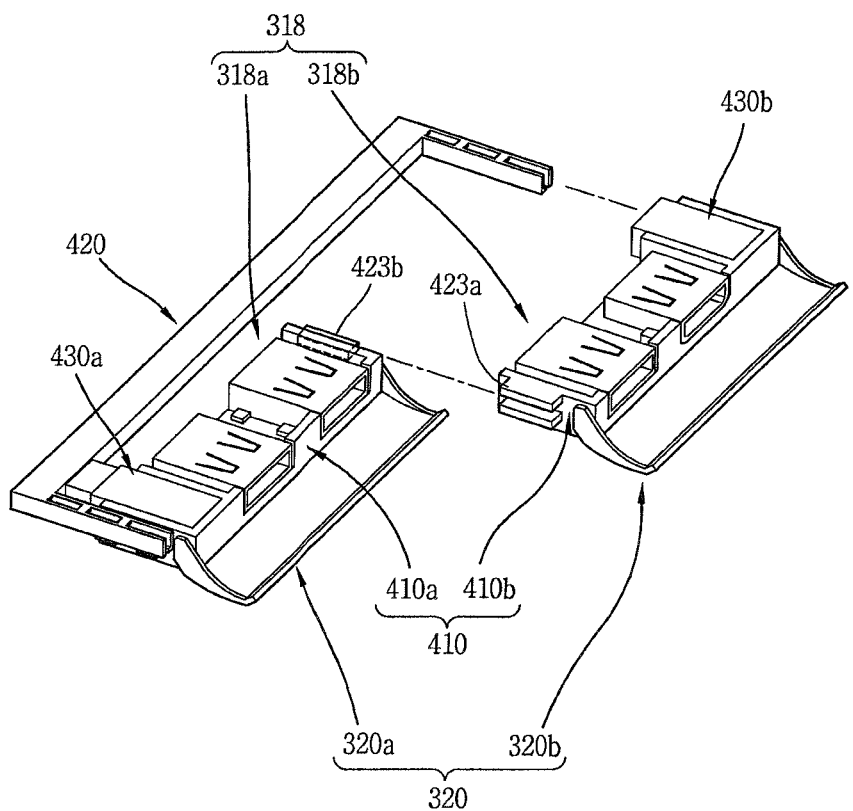
FIG. 8 is an exploded view illustrating another embodiment of a portable electronic apparatus associated with the present invention.

FIG. 8 is an exploded view illustrating another embodiment of a portable electronic apparatus associated with the present invention.

Referring to the drawing, the connection ports 318 are grouped into a plurality of groups. For example, the connection ports 318 are grouped into a first and a second group 318a, 318b, and the housing 410 and the door 32 may include a first and a second housing 410a, 410b and a first and a second door 320a, 320b to correspond to them. The pressure modules 430a, 430b are provided with a plural number, and placed on the first and the second housing 410a, 410b, respectively.

A guide rail is formed on either one of the first and the second housing 410a, 410b at a lateral surface that faces the other thereof. Through this, for either one of the first and the second housing 410a, 410b, both sides thereof are guided by the guide member 420 and the other housing, respectively.

According to the structure, a first group 318a is exposed while being protruded to the outside if the first door 320a is pressed, and a second group 318b is exposed while being protruded to the outside if the second door 320b is pressed. Through this, the user can selectively use a plurality of groups.

Figure 9A:
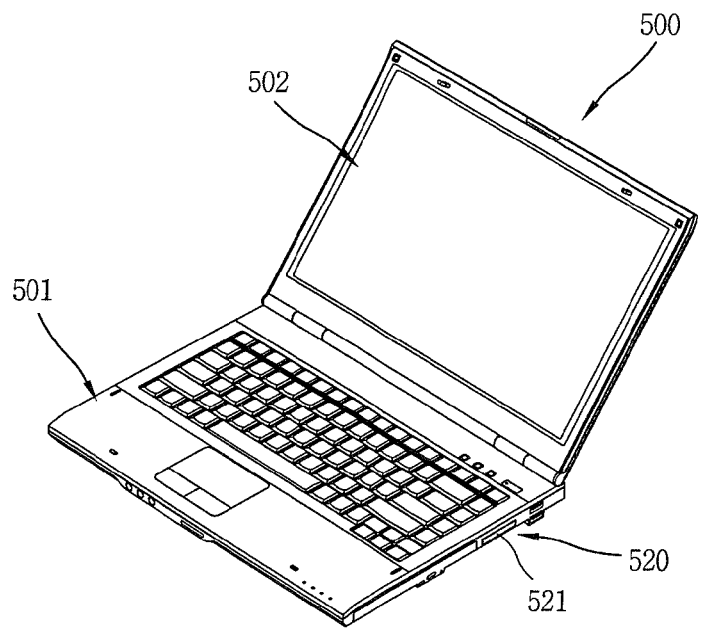
FIGS. 9A and 9B are perspective views illustrating another embodiment of a portable electronic apparatus to which the present invention is applied.
Figure 9B:
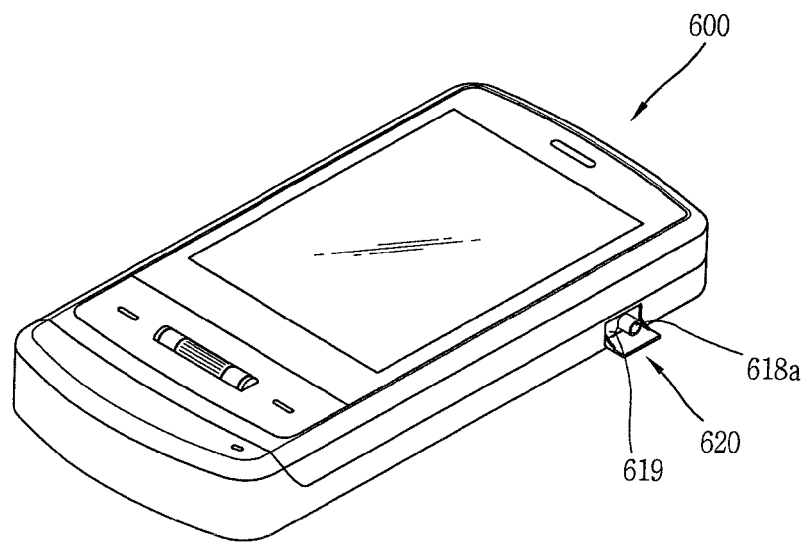

FIGS. 9A and 9B are perspective views illustrating another embodiment of a portable electronic apparatus to which the present invention is applied.

FIG. 9A illustrates a notebook computer 500 as a portable electronic apparatus to which the present invention is applied. The notebook computer 500 may include a first body 501 disposed with a keypad and a second body 502 disposed with a display.

The connection ports (not shown) are disposed at a lateral surface of the communication unit 501, and the cover 521 of the door 520 makes the same plane as a lateral surface of the first body 510. The moving mechanism according to the present invention opens connection ports while at the same time moving them toward the outside when the cover 521 is pressed.

Referring to FIG. 9B, a portable electronic apparatus according to the present invention may include a mobile terminal capable of enabling wireless communication. Hereinafter, it will be described a case where the portable electronic apparatus is a mobile terminal, as an example. A mobile terminal 600 associated with the present invention will not be limited to a bar type as illustrated below, and may be also applicable to various structures such as a slide type, a folder type, a swing type, and the like.

Referring to the drawings, a connection port 618a and an opening 619 are disposed at a lateral surface of the terminal, respectively, and a door 620, which is formed to open or close connection port 618a, is mounted on a body of the terminal 600. A moving mechanism according to the present invention is formed to allow the connection port 618a to be slide when the door 620 is pressed. The detailed structure may be a structure corresponding to the foregoing embodiments.

Referring to the drawing, the connection port 618a may be a connection terminal for connecting to an earphone. In the second configuration in which the door is opened, the connection port 618a is formed to be protruded to the outside from a lateral surface of the terminal 600. In this case, even if the diameter of the connection terminal is large, it is covered by the door 620, thereby implementing an integrated appearance of the terminal, and the connection terminal is protruded when it is used, thereby promoting the use convenience of the user.

A portable electronic apparatus having the foregoing construction associated with the present invention facilitates the user's opening or closing manipulation with respect to the connection port through a moving mechanism. Further, a new structure of opening or closing the connection port, which is different from the related art, may be implemented through a door that is formed to be slid and rotated and a pressure module that is driven by pressure.

In addition, the present invention may implement a mechanism in which a connection port is protruded to the outside of a portable electronic apparatus only when the connection port is used, as the connection port is slid in conjunction with the manipulation of pressing a door. Moreover, the rotation of the connection port is limited through the rotation of the door, thereby more easily implementing the locking of the door.

The configurations and methods according to the above-described embodiments will not be applicable in a limited way to the foregoing portable electronic apparatus, and all or part of each embodiment may be selectively combined and configured to make various modifications thereto.

What is claimed is:

1. A portable electronic apparatus, the apparatus comprising:
   a main body formed with an opening on a surface thereof;
   a plurality of connection ports disposed to be exposed through an opening of the main body;
   a door disposed on the opening to be rotated between a first configuration that covers the connection ports and a second configuration that opens the connection ports;
   a moving mechanism formed to move the connection ports in a direction to be protruded from the opening when the door is rotated to the second configuration, and configured to be operated in conjunction with being pressed of the door; and
   a locking mechanism formed such that the connection ports are locked in the second configuration in conjunction with the rotation of the door to limit the movement of the connection ports in a direction to be inserted into the opening, wherein the moving mechanism comprises:
a guide member having a guide rail, mounted on the main body;
a housing mounted with the connection ports, slidably connected with the guide rail, and formed such that a force exerted to the door is transferred thereto when the door is pressed in the first configuration; and
a pressure module formed such that the length thereof is sequentially increased or decreased by pressure, wherein the pressure module pushes the housing by having its length increased by the force transferred thereto from the housing after the door has been pressed.

2. The apparatus of claim 1, wherein
the pressure module is disposed such that one end thereof is fixed and the other end thereof supports the housing.

3. The apparatus of claim 2, wherein the door is rotatably mounted on the housing, and the locking mechanism is formed such that the door is locked in at least part of the guide member in the second configuration.

4. The apparatus of claim 3, wherein the door comprises:
a cover formed to correspond to the opening; and
rotating blades extended from the both ends of the cover, respectively, and rotatably combined with the housing.

5. The apparatus of claim 4, wherein at least some of the rotating blades are formed to be locked in the guide member in a rotation direction of the door in the first configuration to limit the rotation of the door.

6. The apparatus of claim 4, wherein the locking mechanism is formed such that one surface of the rotating blades is locked in one end of the guide member in a direction to be inserted into the opening by the rotation of the rotating blades.

7. The apparatus of claim 2, wherein the guide member comprises:
a base portion mounted on the main body, and disposed to face the opening; and
a bent portion bent at both ends of the base portion, and formed with the guide rail.

8. The apparatus of claim 7, wherein the pressure module is inserted between the surfaces facing each other of the base portion and the housing.

9. The apparatus of claim 8, wherein the housing is formed with a landing portion on which the pressure module is landed, and
the landing portion is formed such that either one of both surfaces facing each other in a sliding direction of the housing is opened and the other thereof is closed, and
the base portion is formed to face the opened portion of the landing portion.

10. The apparatus of claim 7, wherein the door comprises:
a cover formed to correspond to the opening; and
a rotating blade extended from the cover, and rotatably combined with the housing, and the bent portion is formed with a predetermined length, and
the rotating blade is slid along one surface of the bent portion in conjunction with the sliding of the housing, and rotated if it is disengaged from the one surface of the bent portion.

11. The apparatus of claim 10, wherein the rotating blade is formed such that one end thereof is connected to the cover, and the other end thereof makes a free end, and the rotating blade is rotatably combined with the housing between the both ends, and
the free end is locked in an end portion of the bent portion by being disengaged from one surface of the bent portion to be rotated.

12. The apparatus of claim 2, wherein the housing comprises:
a supporting portion formed to cover an inner surface of the main body, and disposed with a circuit board mounted with the connection ports;
a protruding portion protruded from at least one end of the supporting portion; and
a guide blade portion formed on the protruding portions, and formed to correspond to the guide rail.

13. The apparatus of claim 12, wherein the door is rotatably connected to the protruding portion.

14. The apparatus of claim 1, wherein the moving mechanism is provided with the housing mounted with the connection ports, and slidably connected to the main body, and
the connection port is formed to sequentially pressurize or release the housing in conjunction with being pressed of the door to relatively move with respect to the opening between the first and the second configurations.

15. The apparatus of claim 14, wherein the housing is slidably connected to the guide member mounted on the main body, and the door is rotatably connected to the housing, and
the pressure module is disposed in a lengthy direction such that the length thereof is sequentially increased and reduced by pressure between the housing and guide member.

16. The apparatus of claim 15, wherein the pressure module comprises:
a first and a second body combined to relatively move to each other;
an elastic member disposed to exert an elastic force in a direction that the first and the second body are apart from each other; and
a cam portion installed to be associated with the first and the second body, and formed to guide the movement of the first and the second body by pressure.

17. The apparatus of claim 16, wherein the cam portion comprises:
a cam pin mounted on the first body;
a cam formed on the second body, made to guide the movement of the cam pin along a closed loop, and formed such that it is interlocked at an intermediate position of the closed loop and the interlocking is released by pressure.

* * * * *